United States Patent [19]

Kamen

[11] Patent Number: 5,562,951
[45] Date of Patent: Oct. 8, 1996

[54] METHOD FOR PRINTING ARTICLES WITH MULTIPLE RADIATION CURABLE COMPOSITIONS

[75] Inventor: Melvin E. Kamen, Highlands, N.J.

[73] Assignee: Revlon Consumer Products Corporation, New York, N.Y.

[21] Appl. No.: 432,482

[22] Filed: May 1, 1995

[51] Int. Cl.$^6$ ............................................. B05D 3/06
[52] U.S. Cl. .................... 427/493; 427/265; 427/266; 427/500; 427/558
[58] Field of Search .................... 427/265, 266, 427/493, 500, 558

[56] References Cited

U.S. PATENT DOCUMENTS

| | | | |
|---|---|---|---|
| 4,519,310 | 5/1985 | Shimizu | 101/35 |
| 4,675,234 | 6/1987 | Sachs et al. | 427/500 X |
| 4,927,663 | 5/1990 | Small et al. | 427/500 |
| 5,407,708 | 4/1995 | Lovin et al. | 427/265 X |

OTHER PUBLICATIONS

American Ink Maker, Jul. 1994, "UV Inks Move into the Light".

Primary Examiner—Michael Lusignan
Attorney, Agent, or Firm—Julie Blackburn

[57] ABSTRACT

A method for decorating an article with a plurality of separate and distinct radiation curable compositions, without the need for completely curing each composition prior to application of the next composition, comprising separately applying each single composition to the article in a predetermined design and subjecting said applied composition to the radiation by which it is curable for a period of time sufficient to effect a partial cure of said applied composition, and repeating the application of each single composition followed by partial radiation curing thereof until the last of the desired number of compositions has been applied, after which all of said applied compositions are subjected to the radiation by which they are curable for a period of time sufficient to effect a complete cure of all of said applied compositions.

14 Claims, No Drawings

METHOD FOR PRINTING ARTICLES WITH MULTIPLE RADIATION CURABLE COMPOSITIONS

TECHNICAL FIELD

The invention is in the field of decorating articles with radiation curable compositions.

BACKGROUND OF THE INVENTION

The decoration or printing of articles in multiple colors is widely practiced today. There are several methods commercially used for multiple color printing on glass, ceramic, and plastic articles. In applied ceramic labeling, the design is applied to a glass or ceramic article, followed by firing of the article at high temperatures to secure adherence of the design to the glass. Each color must be separately applied and fired prior to applying the next color, otherwise the colors will run together, particularly if they are applied in partial or complete registration. This is an expensive, time consuming process which also has certain safety considerations such as the use of high temperature ovens, and colored ink compositions which often contain heavy metals.

It is known to print articles such as glass, plastic, or ceramic with colored inks which are radiation curable, thereby eliminating the necessity of firing the article to secure adherence of the ink. However, with these methods it is necessary to cure each separate color completely prior to application of the next color. This is extremely time consuming and greatly increases the cost of the final decorated container.

Accordingly, there is a need for a decorating or printing method which permits multiple applications of colored radiation curable ink onto an article without the necessity of completely curing each separately applied composition prior to application of the next composition, or a "wet on wet" printing method.

SUMMARY OF THE INVENTION

The invention is directed to a method for decorating an article with a plurality of separate and distinct radiation curable compositions, without the need for completely curing each composition prior to application of the next composition, comprising separately applying each single composition to the article in a pre-determined design and subjecting said applied composition to the radiation by which it is curable for a period of time sufficient to effect a partial cure of said applied composition, and repeating the application of each single composition followed by partial radiation curing thereof until the last of the desired number of compositions has been applied, after which all of said applied compositions are subjected to the radiation by which they are curable for a period of time sufficient to effect a complete cure of all of said applied compositions.

DETAILED DESCRIPTION

The Article

The articles which may be decorated or printed according to the method of the invention may be made of glass, ceramic, polymeric materials, and the like, the only requirement being that the article be capable of being printed in accordance with the method disclosed herein. The article may be in an shape or form, such as a container, sheet, tile, figurine, etc. In the preferred embodiment of the invention the article is made of glass or ceramic and is a container, such as a cosmetic or beverage container.

The Radiation Curable Compositions

The radiation curable compositions of the invention are monomers, oligomers, or low molecular weight homopolymers, copolymers, terpolymers, graft copolymers, or block copolymers, and so on. The only requirement is that the radiation curable composition must be cured or polymerized by exposure to radiation, such as radiation emitted from sources such as electron beams, lasers, actinic, or ultraviolet radiation lamps. Suitable monomers include urethanes, epoxides, alkylene monomers such as ethylene, propylene, butylene, and so on, vinyl halide monomers such as vinyl chloride, vinyl monomers, cycloaliphatic epoxides, styrene, alkyl acrylates such as methyl acrylate, ethyl acrylate, acrylic acid, vinyl acetate difunctional acrylic monomers such as hydroxy alkyl acrylates or hydroxy alkyl methacrylates, vinyl butyrate, vinyl methyl ether, methyl methacrylate, isobornyl acrylate, acrylonitrile, or mixtures thereof.

Suitable polymers include oligomers, homo- or copolymers, terpolymers, graft copolymers of the above monomers provided they have a molecular weight of less than 100,000, otherwise it is too difficult to effect polymerization.

The preferred compositions of the invention are pigmented radiation curable compositions, and in particular where each separate ink composition which is applied to the article to be decorated is pigmented with a different color. A wide variety of pigments are suitable including organic and inorganic pigments known to be used in pigmenting radiation curable compositions. Examples of such pigments are set forth in U.S. Pat. No. 5,178,952 which is hereby incorporated by reference. Inorganic pigments include extender pigments such as baryites, barium sulfate, calcium carbonate, talc, clay, alumina, titanium dioxide, white carbon, chinese white, zinc sulfide, lithopone, ultramarine, Prussian blue, cobalt, chorme, oxide, viridian chrome green, yellows, oranges, and reds, cadmium, chromium, iron oxides, carbon black, metallic pigments, aluminum powder, bronze powder, zinc chromate, strontium chromate, zinc dust, copper, and so on. Examples of suitable organic pigments include azo pigments, indolinones, isoindolinones, vat pigments, the Lakes, pthalocyanine pigments and so on.

The preferred radiation curable compositions in accordance with the invention are cured by exposure to ultraviolet radiation, and are epoxides, in particular, cationically radiation curable cycloaliphatic epoxides as disclosed in U.S. Pat. application Ser. No. 199,415 now U.S. Pat. No. 5,391,247 and U.S. Ser. No. 199,414, both filed Feb. 22, 1994, which are hereby incorporated by reference. The preferred red and yellow pigments used in the epoxide based radiation curable compositions are isoindolinones and pyrrolopyrrols, which provide nice, true, color and do not interfere with radiation curing of the compositions.

The Method

The method of the invention permits wet-on-wet multiple color printing of an article without the necessity of completely curing each separate ink prior to application of the next ink. This greatly enhances the speed and energy efficiency of printing articles with multiple colors, and significantly decreases the end cost of decorating. The process of the invention is very adaptable to on-line decorating processes using standard equipment.

The order in which the desired number of radiation curable compositions are applied to the article does not matter. In general, it is logical that the colored design which covers most of the article surface would be applied first, followed by the colors which form smaller portions of the design. The radiation curable compositions can be applied by any of the methods well known in the art, such as screen printing, gravure printing, hand application, and the like. Each separate composition is singly applied in a pre-determined configuration. The applied composition is then subjected to the radiation by which it is curable for a period of time to effect only a partial cure of said applied composition. The degree of curing is partial, meaning that it is something less than a complete cure, and is, in general, sufficient to cause a "skin" to form on the surface of the applied polymer. The term "skin" means that the applied composition has formed a solid film with a tack-free surface in which the active functional groups are not completely reacted. The radiation dose, in particular the ultraviolet radiation dose for a half cured coating film is measurable by UV radiometer, e.g. the measurement of the same amount of energy used for obtaining tack free surface coatings. The unit of half cure UV dose is defined as the energy irradiated on unit area (for example $mj/cm^2$). The half cure UV dose for different formulas according to the invention range from as low as 40 $mj/cm^2$ for acrylates to 1,000 $mj/cm^2$ or more for epoxy, cationic photo initiated systems. This degree of curing is of sufficient strength to permit application of successive colored layers, even in complete or partial registration, without causing smudging, bleeding, or running. Generally, this degree of curing can be achieved in a cure time of from 0.05 seconds to 5 minutes, but usually is closer to 0.05 to 10 seconds, more preferably 0.05 to 5 seconds at room temperature. Increasing the temperature may further reduce the period of time in which the applied compositions partially cure, however since most decorating is conducted in factories using on-line systems, it may be not be practicable to elevate the temperature to effect faster curing. The partial cure can be easily achieved with ordinary radiation sources such as lamps, lasers, and the like, in a variety of different configurations. Obviously, the greater the intensity of the radiation, the shorter the time necessary to achieve the required degree of cure to enable the next color to be applied without bleeding, smuding, or smearing. Preferably, the process of the invention is used in an on-line system such as the system set forth in the copending patent application by Kamen, et. al, entitled "Apparatus and Method For Screen Printing Radiation Curable Compositions", which application is filed on the same day as this application and is hereby incorporated by references. In this on-line system, each separate color is applied at a separate workstation and as the article is rolled away toward the next work station, a radiation source which is remote from the article, or which is positioned such that the radiation shines through the article (if it is clear glass) thus filtering out a substantial amount of the radiation and permitting only a small amount to come into contact with the applied composition, or the radiation source is out of focus with respect to the rays incident on the article. This placement of the radiation source will preclude polymerization of the ink compositions while they are in the screen, yet cause partial curing of the radiation curable composition after it is applied to the article which is being decorated. The optimum time and temperature for achieving the appropriate degree of partial cure is 0.05 to 5 seconds at room temperature with a radiation intensity of 15 to 20,000 $mj/cm^2$. When using the preferred cycloaliphatic epoxides as the basic radiation curable composition, the appropriate degree of partial cure is achieved in 0.05 to 5 seconds at room temperature with a ultraviolet radiation intensity of 300 to 1,500 $mj/cm^2$.

After all of the desired compositions have been applied, the decorated article is subjected to radiation for a period of time sufficient to enable a complete cure of all of the applied compositions. This period of time may range from 1 second to 30 minutes, depending on the polymers and pigments used, the intensity of the radiation source, and the temperature at which the final cure is conducted.

The invention will be further described in connection with the following examples which are set forth for the purpose of illustration only.

Example 1

A red ink composition was made as follows:

|  | grams | w/w % |
| --- | --- | --- |
| Cyracure UVR 6110 (Union Carbide) | 50.00 | 50.63 |
| Polyol 310 (Union Carbide) | 6.25 | 6.33 |
| Cyracure UVI 6974 | 5.00 | 5.06 |
| BK-053 (BYK Chemie) | 7.50 | 7.59 |
| Irgazan Red DPP 80 (Ciba Geigy) | 25.00 | 25.32 |
| Irgazan Yellow 2GLTE (Ciba Geigy) | 5.00 | 5.0 |

The first three ingredients were mixed together and the pigments added. The ink was Example 2

A yellow ink composition was made as follows:

|  | grams | w/w % |
| --- | --- | --- |
| Cyracure UVR 6110 (Union Carbide) | 50.00 | 50.63 |
| Polyol 310 (Union Carbide) | 6.25 | 6.33 |
| Cyracure UVI 6974 | 5.00 | 5.06 |
| BK-053 (BYK Chemie) | 7.50 | 7.59 |
| Irgazan Yellow 2GLTE (Ciba Geigy) | 30.00 | 30.39 |

The first three ingredients were mixed together and then the pigments were added before final mixing.

Example 3

The ink composition of Example 1 is transferred to a glass container using a silk screen process. The container is subjected to UV radiation for approximately 1 second to effect partial cure so that the ink has a "skin" on top. When touched with a fingertip the skin has a non-tacky surface. The ink composition of Example 2 is applied to the container using a silk screen process in partial registration with the first applied composition. The second composition is subjected to UV radiation for a period of 1 second, which effects partial cure. No bleeding or smudging is observed. The red ink composition of Example 1 is applied by silk screen in a design which is in partial registration with the previously applied yellow design. No smudging or bleeding is observed. The applied ink compositions are subject to UV radiation for 6 minutes to effect final cure.

We claim:

1. A method for decorating a glass container with a plurality of separate and distinct anhydrous ultraviolet radiation curable pigmented compositions, without the need for completely curing each composition prior to application of the next composition, comprising separately silk screening each single composition to the article in a selected design which leaves some gas of the glass container surface ink-free, and subjecting said applied composition to ultraviolet radiation for a period of time sufficient to effect a partial cure of said applied composition, and repeating the silk screening of each single composition in a selected design which leaves some areas of the glass container surface ink-free, followed by partial ultraviolet radiation curing thereof until the last of the desired number of compositions has been applied, after which all of said applied compositions are subjected to ultraviolet radiation for a period of time sufficient to effect a complete cure of all of said applied compositions.

2. The method of claim 1 wherein the article is decorated with from two to twenty distinct radiation curable compositions.

3. The method of claim 1 wherein the compositions are applied in partial registration or complete registration.

4. The method of claim 1 wherein the compositions are applied in partial registration or complete registration.

5. The method of claim 1 wherein the period of time to effect partial cure is 0.05 seconds to 5 minutes.

6. The method of claim 5 wherein the intensity of the ultraviolet radiation source is 15 to 20,000 mj/cm$^2$.

7. The method of claim 6 wherein the partial cure is achieved by subjecting said applied compositions to an out of focus ultraviolet light source.

8. The method of claim 6 wherein the partial cure is achieved by shining an ultraviolet light source through the glass so that the glass filters out a substantial portion of the ultraviolet light rays.

9. The method of claim 1 wherein each separate and distinct composition is applied and partially cured at a separate work station.

10. The method of claim 7 wherein the radiation curable compositions are polymeric compositions which exhibit high bond strength to glass.

11. The method of claim 1 wherein the partial cure is sufficient to provide a skin on the surface of the applied radiation curable composition.

12. The method of claim 1 wherein hot stamping foil is subsequently applied to a portion of the decorated article by compressing a layer of hot stamping foil against the cured applied compositions at the desired location with a heated die causing a portion of the foil to adhere to the cured composition to which it was applied but not to the glass.

13. A method for decorating a glass container with two to ten separate and distinct anhydrous ultraviolet radiation curable pigmented compositions comprising the steps of:

a) silk screening the first composition to the article in a selected design which leaves some areas of the glass container surface ink-free, b) subjecting said first composition to ultraviolet radiation having an intensity of 15 to 20,000 mj/cm$^2$ for 0.05 seconds to five minutes to effect partial cure of said applied composition so that it forms a skin on the surface thereof.

c) separately silk screening each single successive composition in a selected design that leaves some areas of the glass container surface ink-free, followed by subjecting said composition to ultraviolet radiation to effect a partial cure of said applied composition until all of the desired compositions have been applied, d) subjecting all of the silk screened compositions to ultraviolet radiation for a period of time sufficient to effect complete cure of the applied compositions.

14. The method of claim 13 wherein the partial cure is achieved by subjecting the composition to ultraviolet light from an out of focus ultraviolet light source, or by shining an ultraviolet light source through the glass so that a substantial portion of the ultraviolet light rays are filtered out by the glass.

* * * * *

UNITED STATES PATENT AND TRADEMARK OFFICE
CERTIFICATE OF CORRECTION

PATENT NO. : 5,562,951

DATED : October 8, 1996

INVENTOR(S) : Melvin E. Kamen

It is certified that error appears in the above-identified patent and that said Letters Patent is hereby corrected as shown below:

In column 5, line 2, after "which leaves some" delete "gas" and insert therefor --areas--.

Signed and Sealed this

Seventeenth Day of December, 1996

Attest:

BRUCE LEHMAN

*Attesting Officer*     *Commissioner of Patents and Trademarks*